(12) United States Patent
Leddy et al.

(10) Patent No.: US 7,080,161 B2
(45) Date of Patent: Jul. 18, 2006

(54) ROUTING INFORMATION EXCHANGE

(75) Inventors: John G. Leddy, Marblehead, MA (US); Michael A. Lloyd, San Carlos, CA (US); Sean P. Finn, Belmont, CA (US); James G. McGuire, San Francisco, CA (US); Omar C. Baldonado, Palo Alto, CA (US); Herbert S. Madan, Tiburon, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 619 days.

(21) Appl. No.: 09/903,441

(22) Filed: Jul. 10, 2001

(65) Prior Publication Data

US 2002/0184393 A1 Dec. 5, 2002

Related U.S. Application Data

(60) Provisional application No. 60/275,206, filed on Mar. 12, 2001, provisional application No. 60/241,450, filed on Oct. 17, 2000.

(51) Int. Cl.
*G06F 15/16* (2006.01)

(52) U.S. Cl. .................. 709/250; 709/219; 709/220; 709/239; 370/392; 370/397

(58) Field of Classification Search ............... 709/225, 709/238, 246, 219, 220, 239, 250; 370/397, 370/392, 351, 422, 463; 340/825; 379/219; 710/316; 375/219; 703/23–28
See application file for complete search history.

(56) References Cited

U.S. PATENT DOCUMENTS

| 4,284,852 | A | 8/1981 | Szybicki et al. ........ 179/18 EA |
|---|---|---|---|
| 4,345,116 | A | 8/1982 | Ash et al. ................ 179/18 EA |
| 4,495,570 | A | 1/1985 | Kitajima et al. ............. 364/200 |
| 4,594,704 | A | 6/1986 | Ollivier ........................ 370/16 |
| 4,669,113 | A | 5/1987 | Ash et al. .................... 379/221 |
| 4,704,724 | A | 11/1987 | Krishnan et al. ........... 379/221 |
| 4,726,017 | A | 2/1988 | Krum et al. ................... 370/85 |
| 4,748,658 | A | 5/1988 | Gopal et al. ................ 379/221 |
| 4,788,721 | A | 11/1988 | Krishnan et al. ........... 379/221 |
| 4,839,798 | A | 6/1989 | Eguchi et al. .............. 364/200 |
| 4,920,432 | A | 4/1990 | Eggers et al. .............. 360/33.1 |
| 4,931,941 | A | 6/1990 | Krishnan .................... 364/437 |

(Continued)

FOREIGN PATENT DOCUMENTS

EP 0 504 537 3/1991

(Continued)

OTHER PUBLICATIONS

The MASC/BGMP Architecture for Inter-domain Multicast.- Kumar, Radoslavov.. (1998) ; www-mash.cs.berkeley.edu/cs268/papers/BGMP.pdf.*

(Continued)

*Primary Examiner*—Thong Vu
(74) *Attorney, Agent, or Firm*—Haverstock & Owens LLP

(57) ABSTRACT

Network architectures and protocols to support enhancements to the decision making process of standard routing protocols are described. Embodiments allow decisions to be exchanged between networks, or autonomous systems, about which internetwork paths have been chosen for outbound traffic. Some embodiments of the invention allow information about the measured performance of internetwork paths to be exchanged between autonomous systems. Embodiments allow additional policy information to be communicated between networks, including but not limited to information about why local policy decisions have been made; requests of policies from remote networks; performance information about particular paths; and informational status. Such information may be exchanged dynamically between networks.

50 Claims, 3 Drawing Sheets

U.S. PATENT DOCUMENTS

| | | | |
|---|---|---|---|
| 4,939,726 A | 7/1990 | Flammer et al. | 370/94.1 |
| 4,949,187 A | 8/1990 | Cohen | 358/335 |
| 4,949,248 A | 8/1990 | Caro | 364/200 |
| 5,142,570 A | 8/1992 | Chaudhary et al. | 379/221 |
| 5,172,413 A | 12/1992 | Bradley et al. | 380/20 |
| 5,253,341 A | 10/1993 | Rozmanith et al. | 395/200 |
| 5,287,537 A | 2/1994 | Newmark et al. | 395/800 |
| 5,291,554 A | 3/1994 | Morales | 380/5 |
| 5,341,477 A | 8/1994 | Pitkin et al. | 395/200 |
| 5,361,256 A | 11/1994 | Doeringer et al. | 370/60 |
| 5,371,532 A | 12/1994 | Gelman et al. | 348/7 |
| 5,375,070 A | 12/1994 | Hershey et al. | |
| 5,406,502 A | 4/1995 | Haramaty et al. | 364/551.01 |
| 5,410,343 A | 4/1995 | Coddington et al. | 348/7 |
| 5,414,455 A | 5/1995 | Hooper et al. | 348/7 |
| 5,442,389 A | 8/1995 | Blahut et al. | 348/7 |
| 5,442,390 A | 8/1995 | Hooper et al. | 348/7 |
| 5,442,749 A | 8/1995 | Northcutt et al. | 395/200.09 |
| 5,452,294 A | 9/1995 | Natarajan | 370/54 |
| 5,467,345 A | 11/1995 | Cutler, Jr. et al. | 370/60 |
| 5,471,622 A | 11/1995 | Eadline | 395/650 |
| 5,475,615 A | 12/1995 | Lin | 364/514 |
| 5,477,536 A | 12/1995 | Picard | 370/54 |
| 5,508,732 A | 4/1996 | Bottomley et al. | 348/7 |
| 5,515,511 A | 5/1996 | Nguyen et al. | 395/200.2 |
| 5,519,435 A | 5/1996 | Anderson | 348/8 |
| 5,521,591 A | 5/1996 | Arora et al. | 340/826 |
| 5,528,281 A | 6/1996 | Grady et al. | 348/7 |
| 5,535,195 A | 7/1996 | Lee | 370/54 |
| 5,563,875 A | 10/1996 | Hefel et al. | 370/15 |
| 5,629,930 A | 5/1997 | Beshai et al. | 370/396 |
| 5,631,897 A | 5/1997 | Pacheco et al. | 370/237 |
| 5,636,216 A | 6/1997 | Fox et al. | 370/402 |
| 5,668,800 A | 9/1997 | Stevenson | 370/248 |
| 5,675,741 A | 10/1997 | Aggarwal et al. | 395/200.1 |
| 5,754,547 A | 5/1998 | Nakazawa | 370/401 |
| 5,754,639 A | 5/1998 | Flockhart et al. | 379/221 |
| 5,787,253 A | 7/1998 | McCreery et al. | 395/200.61 |
| 5,793,976 A | 8/1998 | Chen et al. | 395/200.54 |
| 5,802,106 A | 9/1998 | Packer | |
| 5,805,594 A | 9/1998 | Kotchey et al. | 370/401 |
| 5,835,710 A | 11/1998 | Nagami et al. | 395/200.8 |
| 5,841,775 A * | 11/1998 | Huang | 370/422 |
| 5,845,091 A | 12/1998 | Dunne et al. | 395/200.7 |
| 5,884,047 A | 3/1999 | Aikawa et al. | 395/200.68 |
| 5,974,457 A | 10/1999 | Waclawsky et al. | |
| 6,006,264 A | 12/1999 | Colby et al. | 709/226 |
| 6,009,081 A | 12/1999 | Wheeler et al. | 370/255 |
| 6,012,088 A * | 1/2000 | Li et al. | 709/219 |
| 6,026,411 A | 2/2000 | Ronen | |
| 6,052,718 A * | 4/2000 | Gifford | 709/219 |
| 6,069,889 A | 5/2000 | Feldman et al. | 370/351 |
| 6,108,703 A | 8/2000 | Leighton et al. | 709/226 |
| 6,111,881 A | 8/2000 | Soncodi | 370/395 |
| 6,119,235 A | 9/2000 | Vaid et al. | |
| 6,130,890 A | 10/2000 | Leinwand et al. | 370/400 |
| 6,167,052 A | 12/2000 | McNeil et al. | 370/399 |
| 6,173,324 B1 | 1/2001 | D'Souza | 709/224 |
| 6,185,598 B1 | 2/2001 | Farber et al. | 709/200 |
| 6,275,470 B1 | 8/2001 | Ricciulli | |
| 6,282,562 B1 | 8/2001 | Sidi et al. | |
| 6,286,045 B1 | 9/2001 | Griffiths et al. | |
| 6,339,595 B1 * | 1/2002 | Rekhter et al. | 370/392 |
| 6,341,309 B1 | 1/2002 | Vaid et al. | |
| 6,385,643 B1 | 5/2002 | Jacobs et al. | 709/203 |
| 6,415,323 B1 * | 7/2002 | McCanne et al. | 709/225 |
| 6,426,955 B1 | 7/2002 | Gossett, Jr. et al. | 370/401 |
| 6,434,606 B1 | 8/2002 | Borella et al. | |
| 6,438,592 B1 | 8/2002 | Killian | |
| 6,446,028 B1 | 9/2002 | Wang | 702/186 |
| 6,452,950 B1 | 9/2002 | Ohlsson et al. | |
| 6,453,356 B1 | 9/2002 | Sheard et al. | 709/231 |
| 6,463,454 B1 | 10/2002 | Lumelsky et al. | |
| 6,493,353 B1 | 12/2002 | Kelly et al. | 370/467 |
| 6,526,056 B1 * | 2/2003 | Rekhter et al. | 370/392 |
| 6,538,416 B1 | 3/2003 | Hahne et al. | 320/431 |
| 6,601,098 B1 | 7/2003 | Case et al. | |
| 6,601,101 B1 | 7/2003 | Lee et al. | 709/227 |
| 6,608,841 B1 | 8/2003 | Koodli | |
| 6,611,872 B1 * | 8/2003 | McCanne | 709/238 |
| 6,625,648 B1 | 9/2003 | Schwaller et al. | |
| 6,631,419 B1 * | 10/2003 | Greene | 709/238 |
| 6,633,640 B1 | 10/2003 | Cohen et al. | |
| 6,704,768 B1 | 3/2004 | Zombek et al. | 709/201 |
| 6,714,549 B1 * | 3/2004 | Phaltankar | 370/397 |
| 6,728,777 B1 | 4/2004 | Lee et al. | 709/238 |
| 6,728,779 B1 * | 4/2004 | Griffin et al. | 709/239 |
| 6,748,426 B1 | 6/2004 | Shaffer et al. | |
| 6,751,562 B1 | 6/2004 | Blackett et al. | 702/61 |
| 6,757,255 B1 | 6/2004 | Aoki et al. | 370/252 |
| 6,766,381 B1 * | 7/2004 | Calvignac et al. | 709/246 |
| 6,810,417 B1 * | 10/2004 | Lee | 709/220 |
| 6,820,133 B1 | 11/2004 | Grove et al. | 709/238 |
| 6,826,613 B1 | 11/2004 | Wang et al. | 709/227 |
| 6,829,221 B1 | 12/2004 | Winckles et al. | 370/238 |
| 6,839,745 B1 | 1/2005 | Dingari et al. | 709/219 |
| 6,912,222 B1 | 6/2005 | Wheeler et al. | 370/395.31 |
| 6,981,055 B1 | 12/2005 | Ahuja et al. | 709/238 |
| 2001/0037311 A1 | 11/2001 | McCoy et al. | |
| 2002/0038331 A1 | 3/2002 | Flavin | 709/105 |
| 2002/0101821 A1 | 8/2002 | Feldmann et al | 370/232 |
| 2002/0124100 A1 | 9/2002 | Adams | 709/232 |
| 2002/0184527 A1 | 12/2002 | Chun et al. | 713/201 |
| 2003/0016770 A1 | 1/2003 | Trans et al. | 375/346 |
| 2003/0191841 A1 | 10/2003 | DeFerranti et al. | 709/226 |

FOREIGN PATENT DOCUMENTS

| | | |
|---|---|---|
| EP | 0528 075 | 2/1993 |
| EP | 0 788 267 | 8/1997 |
| EP | 0 598 969 B1 | 2/1999 |
| EP | 0 942 560 | 9/1999 |
| EP | 0 977 456 A2 | 2/2000 |
| EP | 0 982 901 A1 | 3/2000 |
| EP | 0 999 674 A1 | 5/2000 |
| WO | 94/08415 | 4/1994 |
| WO | 99/06913 | 2/1999 |
| WO | 99/14907 | 3/1999 |
| WO | 99/14931 | 3/1999 |
| WO | 99/14932 | 3/1999 |
| WO | 99/18751 | 4/1999 |
| WO | 99/30460 | 6/1999 |
| WO | 99/39481 | 8/1999 |
| WO | 00/04458 | 1/2000 |
| WO | WO 00/25224 | 5/2000 |
| WO | WO 00/38381 | 6/2000 |
| WO | 00/45560 | 8/2000 |
| WO | 00/52906 | 9/2000 |
| WO | 00/62489 | 10/2000 |
| WO | 00/72528 | 11/2000 |
| WO | 00/79362 | 12/2000 |
| WO | 00/79730 | 12/2000 |
| WO | 01/06717 | 1/2001 |
| WO | 01/13585 | 2/2001 |
| WO | WO 02/033896 A3 | 4/2002 |

OTHER PUBLICATIONS

An Architecture for Advance Reservations in the Internet—Berson, Lindell, Braden (1998); www.isi.edu/~berson/advance.p.*

Constructing Optimal IP Routng Tables—Draves, King, Venkatachary, Zill (1999); www.ieee-infocom.org/1999/papers/01c_03.pdf.*

An Analysis of Internet Inter-Domain Topology and Route..-Govindan, Reddy (1997) ;ftp.isi.edu/pub/cengiz/analysis.ps.*

Toward a Framework for Defining Internet Performance Metrics; www.isoc.org/isoc/whatis/conferences/inet/96/proceedings/d3/d3_3.htm.* quimby.gnus.org/internet-drafts/draft-ietf-rps-rpsl-v2-00.txt; quimby.gnus.org/internet-drafts/draft-ietf-rps-rpsl-v2-00.txt.*

Network Working Group P. Traina, Editor Request for Comments:..- Status Of This www.tzi.de/~cabo/pdfrfc/rfc1774.txt.pdf.*

On Network-Aware Clustering of Web Clients—Krishnamurthy, Wang (2000) www.research.att.com/~bala/papers/sigcomm2k.ps.*

BGP-4 Protocl analysis; http://www.rfc-editor.org/rfc/rfc1774.txt.*

RPSL draft; http://quimby.gnus.org/internet-drafts/draft-ietf-rps-rpsl-v2-03.txt.*

Internet Protocol; http://www.arvelo.net/net-bay-ip.html.*

A longest Prefix match Search Engine for Multi-Gigabit IP processing; IEEE 2000.*

J. Yu; "Scalale Routing Design Principles"; Ref. No. XP002191098, RFC 2791 Network Working Group; Jul. 31, 2000; pp. 1-24.

Paul Francis et al., "An Architecture for a Global Internet Host Distance Estimation Service", IEEE, Mar. 25. 1999, pp. 210-217.

Z. Wang et al, "Resource Allocation for Elastic Traffic: Architecture and Mechanisms," Conference Proceedings Article, 2000, XP010376681, p. 165, paragraph 5.6-p. 166.

Papadopoulos, Constantinos, et al., "Microprocessing and Microprogramming", *Protection and Routing Algorithms for Network Management*, Sep. 1993, vol. 38, Nos. 1/5, pp. 163-170.

T. Bates et al., XP-00219077, "Multiprotocol Extensions for BGP-4", Jun. 2000, p. 1-10.

Yasushi Saito et al., "Manageability, Availability and Performance in Porcupine: A Highly Scalable, Cluster-Based Mail Service", 17th ACM Symposium on Operating System Principles, pp. 1-15, Dec. 1999.

Nikolaos Skarmeas et al., "Content Based Routing as the Basis for Intra-Agent Communication", Department of Computing Imperial College London.

Nikolaos Skarmeas et al., "Intelligent Routing Based on Active Patterns as the Basis for the Integration of Distributed Information Systems", Department of Computing Imperial College London, Feb. 1997.

R. Govindan et al., "Heuristics for Internet Map Discovery", USC/Information Sciences Institute, pp. 1-11.

A. Feldmann et al., "Deriving Traffic Demands for Operational IP Networks: Methodology and Experience", pp. 1-14.

Sami Iren et al., "The Transport Layer: Tutorial and Survey", XP-002210446, ACM Computing Surveys, vol. 31, No. 4, Dec. 1999, pp. 360-405.

D. B. Ingham et al., "Supporting Highly Manageable Web Services", Computer Networks and ISDN Systems 29 (1997), pp. 1405-1416.

* cited by examiner

ROUTING INFORMATION EXCHANGE

CROSS REFERENCE TO RELATED APPLICATIONS

This application claims priority to U.S. Provisional Application Nos. 60/241,450, filed Oct. 17, 2000 and 60/275,206, filed Mar. 12, 2001, which are hereby incorporated by reference in their entirety.

BACKGROUND OF THE INVENTION

1. Field of the Invention

This invention relates to the field of networking. In particular, the invention relates to measurements of network performance and optimization of network routing.

2. Description of the Related Art

The Internet today is comprised of groups of networks each run independently. Networks that build their own routing view of the Internet by connecting to multiple Internet Service Providers (ISPs) are Autonomous Systems (AS) and are assigned a unique 16 bit AS number. These networks exchange routing information about their Internet connectivity using BGP4.

As the Internet has grown, service providers have stratified into several categories. The trend has been moving toward 3 main categories: National/International Tier One ISP, Content Provider/Content Hoster and User Access Providers. This specialization has shown some weaknesses with the current system of distributed Internet decision-making.

National/International Tier One Internet Service Providers (ISPs)

As the Internet has evolved, there are fewer numbers of large Tier One providers able to compete by rebuilding their networks with newer high-speed routers, transmission gear, and access to dark fiber. As such, the difference between the top providers has decreased and the view of the Internet that is passed to multi-homed customers is very similar. Many routing decisions result from breaking ties or by enforcement of routing policy by the customers, who attempt to balance load across available capacity. This results in decision making by end customers based on information that is becoming less and less differentiated and does not factor in the performance of the available paths.

The current state of Tier 1 ISPs evinces a need for an automated process for generating routing decisions for such ISPs, based on up-to-date information on the performance of alternative paths.

Content Providers/Content Hosters

Content Providers need to multi-home in order to provide reliable high quality access to the Internet. As it is very difficult and expensive to connect directly with the User Access Providers, connectivity to deliver content needs to be built by connecting to the large Tier One providers as well as by making localized policy decisions. As such, there is almost no coordination between Content Providers and their customers who get their connectivity through User Access Providers.

Content Providers also have the problem of delivering the majority of traffic from their site to their user base. They need to make the decision of which of their directly connected ISPs can best deliver traffic for any particular user group. These decisions are usually made by allowing BGP to choose the "best route" (shortest number of network hops) and subsequently applying a local policy to hand tune the selections for particular destinations of interest. This, however, is not an automated process. Destinations with large/important user groups are forced over paths that seem to provide better service proactively, and customers that complain are examined to see if a switch in paths could provide better service reactively. Issues of local outbound capacity with particular ISP connections often require traffic to be shifted off of even BGP "best route" paths, regardless of performance, in order to ease local congestion.

As such, there is a need for an automated process for selecting best routes for Content Providers to connect to particular user groups.

User Access Providers

User Access Providers need to manage inbound traffic to their user base from Content Providers. Today there are very poor mechanisms to control inbound traffic. Several mechanisms that are in use today are: Traffic Engineering (upgrading and purchasing new links from the "correct" ISPs); BGP padding to make a particular inbound path look bad to the entire Internet; and specific advertisements of small portions of a User Access Providers address space out different ISP links.

Each one of these methods has problematic operational issues. Traffic engineering requires an analysis at a particular time to select what ISPs should be used for future best cost and performance access to the Internet. Many times ISP service availability and local circuit installation require very long lead times. Service availability can often take 6 months or more, and contract terms are typically 1–3 years. By the time an ordered ISP service is available, the initial analysis may no longer be valid. Traffic flows may have changed and the performance of the ISP may have changed significantly.

BGP padding is a method of attempting to influence traffic flows in the Internet by artificially making a path look longer (more AS network hops). The User Access Provider will advertise its own connectivity to an ISP by appending its AS number multiple times in the BGP path. Networks making BGP "best route" decisions will see this path as lengthy and will be more likely to choose another available, shorter, path. This has the effect of reducing inbound traffic to the User Access Provider over the "padded" path. There are, however, several difficulties with this method. For instance, because the "padded" path is communicated to the entire Internet, there is no way to communicate a desired inbound traffic policy to a particular traffic source. This causes significant amounts of traffic to be shifted away from the padded path (i.e., BGP padding allows very little granularity in how much traffic can be influenced to change paths). The results become even less granular as the number of Tier One ISPs decrease and become less differentiated. There is also no way of communicating why the change is being requested and no way to take performance into account when a traffic source using BGP "best route" decisions receives a longer AS Path. As a normal operational procedure, a User Access Provider will "pad" a particular path and observe an initial shift in traffic. This initial traffic change may not be permanent. It may require several days as other networks and traffic sources adjust their policies manually reacting to the change in traffic flows.

Another mechanism used by User Access Providers to influence inbound traffic is to use more specific IP route advertisements of their total address space. The Internet has incorporated CIDR (Classless Inter Domain Routing) into both its routing and forwarding decision-making. CIDR is a mechanism that allows multiple routes that are viable for a particular destination to be present within the Internet. The path that is selected to forward traffic is the route with the more specific match of the destination IP address (longest match).

An example of this type of inbound policy is a User Access Provider that has 2 links, Link 1 and Link 2, each of which communicates with a different ISP, ISP1 and ISP2, respectively. Ordinarily, the advertisements to ISP1 and ISP2 are identical. However, if there is more traffic than can be handled inbound on Link1 associated with ISP1 and there is available capacity on Link2 associated with ISP2, an inbound policy needs to be implemented to shift some traffic. Often a BGP Pad policy to artificially increase the network distance associated with ISP1 will cause a significant amount of traffic to shift to ISP2 and Link2. This may be more traffic than Link2 can carry and require the policy to be removed. To get finer granularity for the amount of traffic that is shifted, a more specific route advertisement is added to the ISP2 advertisement. This will cause traffic for a subset of the User Access Provider's customers to prefer ISP2 and Link2 inbound from the Internet.

Although more control can be achieved over inbound traffic using this approach, it causes several problems. Management of the infrastructure is complicated since different groups of customers will have different performance and paths because of the fragmented policy. It also increases the global Internet route table size by requiring extra routes to be carried by external networks to implement inbound policies. Many network infrastructures will ignore specific route advertisements that are "too small". Currently "too small" is an advertisement of a network route capable of addressing 4,096 hosts (/20 CIDR route). As such, this method will not provide fine granular control for providers with small amounts of address space. Additionally, as is the case with all the inbound solutions, end to end performance is not able to be taken into account when shifting some flows from Link1 to Link2.

Looking Glass

In typical networks, in which routing paths are communicated between Autonomous Systems via BGP, the information about which outbound path has been chosen from among the available paths is not communicated. Although this information is very useful for destination networks to know and act on, there is no mechanism or concept for the exchange of the resulting decisions. A troubleshooting tool that has been deployed by some networks to permit visibility into local routing decisions is called a Looking Glass (LG). The implementation of a LG is most often a WWW based user interface that has a programmatic back end and can run a small number of queries on one of the networks BGP routers. The deployment by networks of LG's is an example of the usefulness of the information. However, though an LG gives information about what path has been chosen to a particular destination by the network that deployed the LG, and the LG gives no information as to the performance or reason behind choosing a non BGP "best route" path.

SUMMARY OF THE INVENTION

Some embodiments of the invention include network architectures and protocols to support enhancements to the decision making process of standard BGP. Some embodiments of the invention include a Routing Information exchange, or RIX. The RIX comprises an overlay network which enables the exchange of routing information between Autonomous Systems (AS s) in an internetwork; one such example of an internetwork is the Internet. Embodiments of the RIX include one or more Points of Presence (POP's) distributed through the internetwork. These POPs may accept feeds from customer premise equipment. In some embodiments, these feeds may take the form of BGP4 feeds which are supplied with local decisions made for forwarding traffic to the internetwork.

In some embodiments of the invention, the RIX may include a Path Selection eXchange (PSX), which allows decisions to be exchanged between autonomous systems about which internetwork paths have been selected for outbound traffic. In some embodiments of the invention, these decisions may take the form of one or more of the following: default BGP selections, local "hand tuned" policies, or performance based decisions. In such embodiments, traditional BGP available path information may be enhanced with information about what paths have been chosen by other Autonomous Systems. Information supplied by the PSX may—by way of non-limiting example—be used for any one of the following: trouble shooting, traffic engineering, and enabling policies. For instance, the information supplied by the PSX may be used to support "symmetric routing", i.e., to keep the forward and reverse network paths equivalent.

Embodiments of the RIX include a Path Performance eXchange (PPX), which allows information about the measured performance of internetwork paths to be exchanged within a localized area. In some embodiments, performance information may be sent to the PPX about internetwork destinations as measured over available paths. In some embodiments of the invention, the PPX may use this information from multiple sources to build a localized path performance database. In some such embodiments, this information may be encoded as a real time feed of performance data sent to customers in the same localized area, or to users who are otherwise expected to experience similar performance. This information can be used to make local policy decisions incorporating performance.

Embodiments of the RIX include a Cooperative Routing eXchange (CRX), which enables additional policy information to be communicated between networks. Non-limiting examples of such policy information include: information about why local policy decisions have been made; requests of policies from remote networks; performance information about particular paths; and informational status, all of which can be exchanged dynamically between networks.

In some embodiments, the components described above work together with standard Internet Routers capable of BGP4, or with specialized equipment at customer premises, also referred to as Performance Aware Customer Premise Equipment (PACPE). However, as will be apparent to those skilled in the art, protocols other than BGP may be employed to send information between Autonomous Systems, PACPEs, and the RIX. By way of non-limiting example, these may be proprietary protocols or standard protocols, such as IDRP (Inter Domain Routing Protocol). In some embodiments of the invention, the RIX can also operate for networks supporting packet formats other than IPv4, for example IPv6 or OSI deployments. These and other embodiments are explained more fully below.

DETAILED DESCRIPTION

A. System Overview of the Routing Information eXchange

Figure 1:
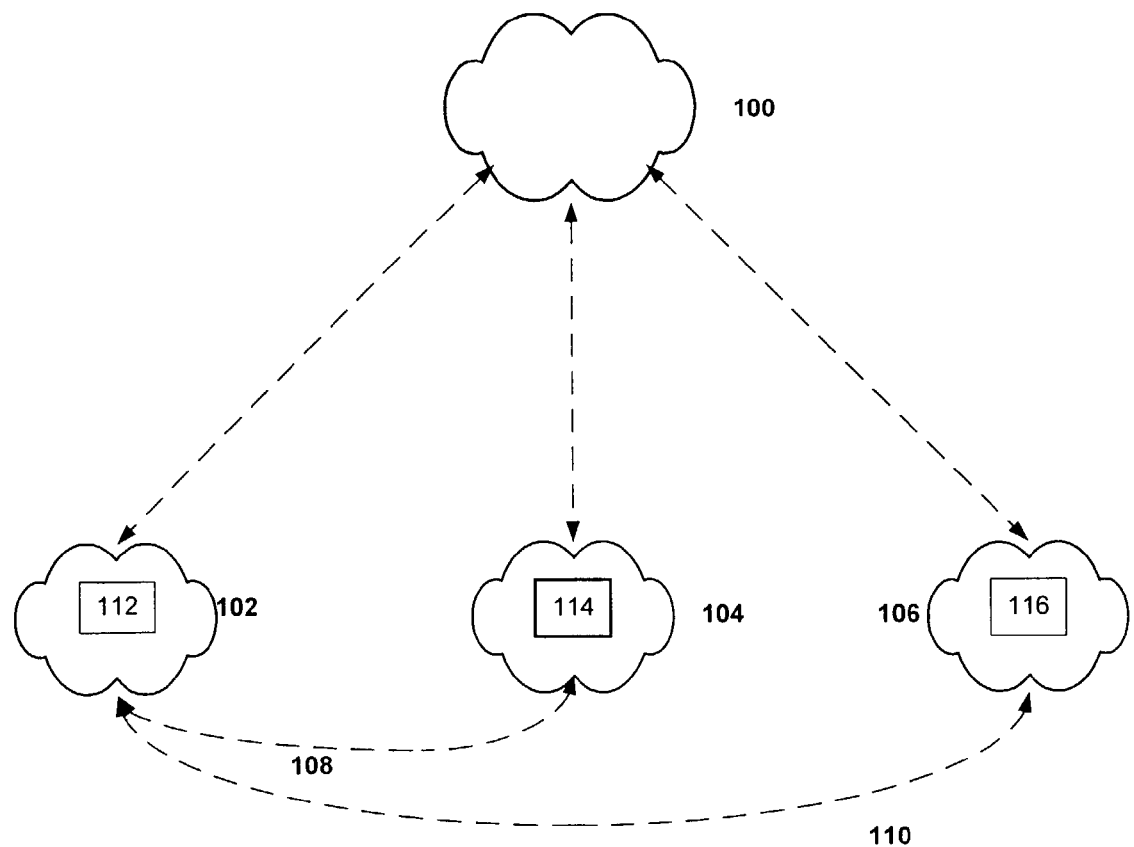
FIG. 1 illustrates an architecture for the Routing Information Exchange, including an overlay network over multiple interconnected autonomous systems, according to some embodiments of the invention.

Some embodiments of the invention support a Routing Information exchange, or RIX, comprising an overlay network 100, schematically illustrated in FIG. 1, which is built to exchange routing information, performance information, decisions, and policy between groups of participating networks 102 104 106 in an internetwork. In an internetwork such as the Internet, these networks comprise Autonomous Systems 102 104 106. An AS 102 may be connected to other AS's 104 106 over paths 108 110 that may be physical or virtual. A BGP4 session may be run between the two AS's 102 104 to exchange a view of the Internet via that path 108. An AS 102 with connectivity to multiple AS's 104 106 takes these views of the Internet building a local combined view through local policies. This results in a decision for which outbound path to use for each possible destination.

The RIX 100 may be implemented in several embodiments using different protocols, which may be proprietary protocols or standard protocols, such as—by way of non-limiting example—IDRP (Inter Domain Routing Protocol). In some embodiments of the invention, the RIX 104 can also work for networks supporting packet formats other than IPv4, for example IPv6 or OSI deployments. Other protocols between networks which are compatible with the RIX 100 will be apparent to those skilled in the art.

In some embodiments of the invention, the RIX 100 may include a Path Selection eXchange (PSX), which allows decisions to be exchanged between autonomous systems 102 104 106 about which internetwork paths have been selected for outbound traffic. In some embodiments of the invention, these decisions may take the form of one or more of the following: default BGP selections, local "hand tuned" policies, or performance based decisions—other decisions that may be exchanged between autonomous systems 102 104 106 will be apparent to those skilled in the art. In such embodiments, traditional BGP available path information may be enhanced with information about what paths have been chosen by other Autonomous Systems. Information supplied by the PSX may—by way of non-limiting example—be used for any one of the following: trouble shooting, traffic engineering, and enabling policies. For instance, the information supplied by the PSX may be used to support "symmetric routing", i.e., to keep the forward and reverse network paths equivalent.

Embodiments of the RIX 100 include a Path Performance eXchange (PPX), which allows information about the measured performance of internetwork paths to be exchanged within a localized area. In some embodiments, performance information may be sent to the PPX about internetwork destinations as measured over available paths. In some embodiments of the invention, the PPX may use this information from multiple sources to build a localized path performance database. In some such embodiments, this information may be encoded as a real time feed of performance data sent to customers in the same localized area, or to users who are otherwise expected to experience similar performance. This information can be used to make local policy decisions incorporating performance.

Embodiments of the RIX 100 include a Cooperative Routing eXchange (CRX), which enables additional policy information to be communicated between autonomous systems 102 104 106. Non-limiting examples of such policy information include: information about why local policy decisions have been made; requests of policies from remote networks; performance information about particular paths; and informational status. The Internet currently functions by use of IPv4 as a network level addressing, formatting and forwarding protocol. Internet routing primarily relies on BGP4 as the standard network to network protocol for exchange of routing information. As such, the rest of this document focuses on using BGP4 as a underlying mechanism for the transport and exchange of information necessary to implement the concept of the RIX (PPX, PSX and CRX) for IPv4 networks within the current Internet or Intranet's. However, the present invention is not limited to BGP4 as the sole gateway protocol between Autonomous Systems 102 104 106, and other alternatives will be apparent to those skilled in the art.

B. IPv4 and BGP4 RIX Implementation

In some embodiments of the invention, the RIX 100 includes one or more Points of Presence (POPs) deployed within the Internet. In some embodiments, these POPs have the capability of accepting BGP4 connections from customer equipment 112 114 116, which may be routers or PACPE (Performance Aware Customer Premise Equipment). A given Autonomous System may include sub-networks for many different organizations, each of which may have one or more PACPEs. PACPEs are further described in U.S. Provisional Application Nos. 60/241,450, filed Oct. 17, 2000 and 60/275,206, filed Mar. 12, 2001, all of which are hereby incorporated by reference in their entirety. In some embodiments of the invention, the BGP4 feed sent to the RIX 100 by the customer 112 114 116 is a standard BGP4 feed which includes the result of the local decisions made for forwarding traffic to the Internet. This is the same feed a customer would establish with a network selling Internet access (BGP4 Transit Feed). This feed establishes a base level of communication between the customer and the RIX 100. It also establishes information used to build the PSX. The information from multiple customer feeds is parsed by the RIX 100 into information specific to each customer.

Figure 2:
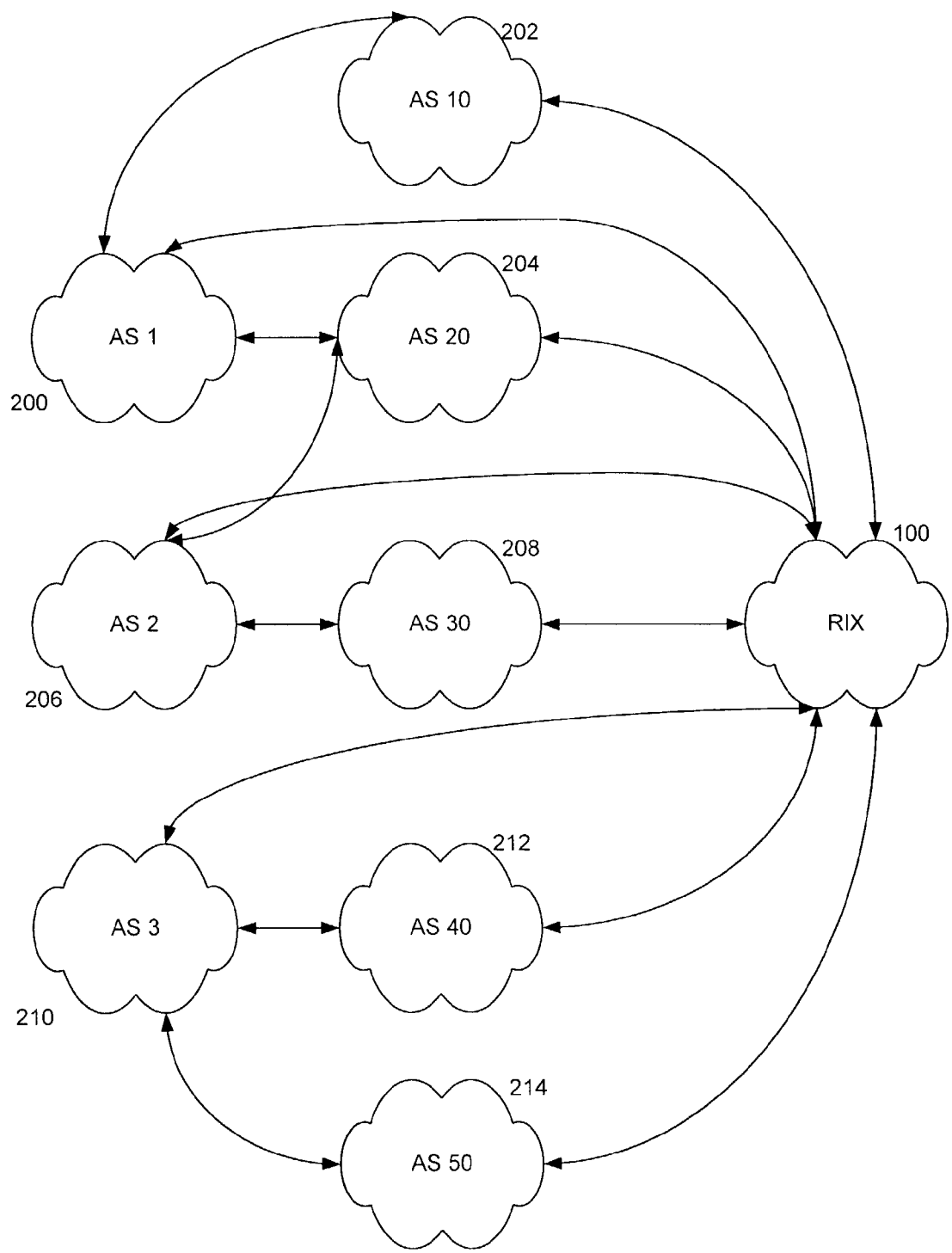
FIG. 2 illustrates an example of a network configuration in which autonomous systems communicate routing performance information and policy decisions via the Routing Information Exchange according to some embodiments of the invention.

As an illustrative, non-limiting example, consider the network illustrated in FIG. 2. A network 192.100.10.X (AS 1) 200 has two ISPs (AS10 and AS20), a second network 192.200.20.X (AS2) 206 has two ISPs (AS20 and AS30) 204 208, and a third network 192.300.30.X (AS3) 210 has two ISPs AS40 and AS50) 212 214. Each network has a eBGP4 connection to the RIX 100 sending their information. The following information is sent from the networks 200 206 210 to the RIX 100:

Network1 to RIX (AS1):
192.100.10.X AS Path:   AS1
192.200.20.X AS Path:   AS1, AS20, AS2
192.300.30.X AS Path:   AS10, ASX, ASY, AS40, AS3
Destination A AS Path:   AS20 . . .
Destination B AS Path:   AS10 . . .
Destination C AS Path:   AS20 . . .
Network2 to RIX (AS2):
192.100.10.X AS Path:   AS20 AS1
192.200.20.X AS Path:   AS2
192.300.30.X AS Path:   AS20, ASZ, AS50, AS3

Destination A AS Path: AS30 . . .
Destination B AS Path: AS30 . . .
Destination C AS Path: AS20 . . .
Network3 to RIX (AS3):
192.100.10.X AS Path: AS50, ASZ, AS20, AS1
192.200.20.X AS Path: AS50, ASZ, AS20, AS2
192.300.30.X AS Path: AS3
Destination A AS Path: AS40 . . .
Destination B AS Path: AS40 . . .
Destination C AS Path: AS50 . . .

The RIX 100 then stores Network Specific Information which may include one or more of the following Reverse Path Information:

Network1 Reverse Path Information

| | | |
|---|---|---|
| 192.100.10.X AS Path: | AS2, AS20 AS1 | Network2 Path |
| 192.100.10.X AS Path: | AS3, AS50, ASZ, AS20, AS1 | Network3 Path |

Network2 Reverse Path Information

| | | |
|---|---|---|
| 192.200.20.X AS Path: | AS1, AS10, AS30, AS2 | Network1 Path |
| 192.200.20.X AS Path: | AS3, AS50, ASZ, AS20, AS2 | Network3 Path |

Network3 Reverse Path Information

| | | |
|---|---|---|
| 192.300.30.X AS Path: | AS1, AS10, ASX, ASY, AS40, AS3 | Network1 Path |
| 192.300.30.X AS Path: | AS2, AS20, ASZ, AS50, AS3 | Network2 Path |

C. RIX BGP4 Annotations

Figure 3:
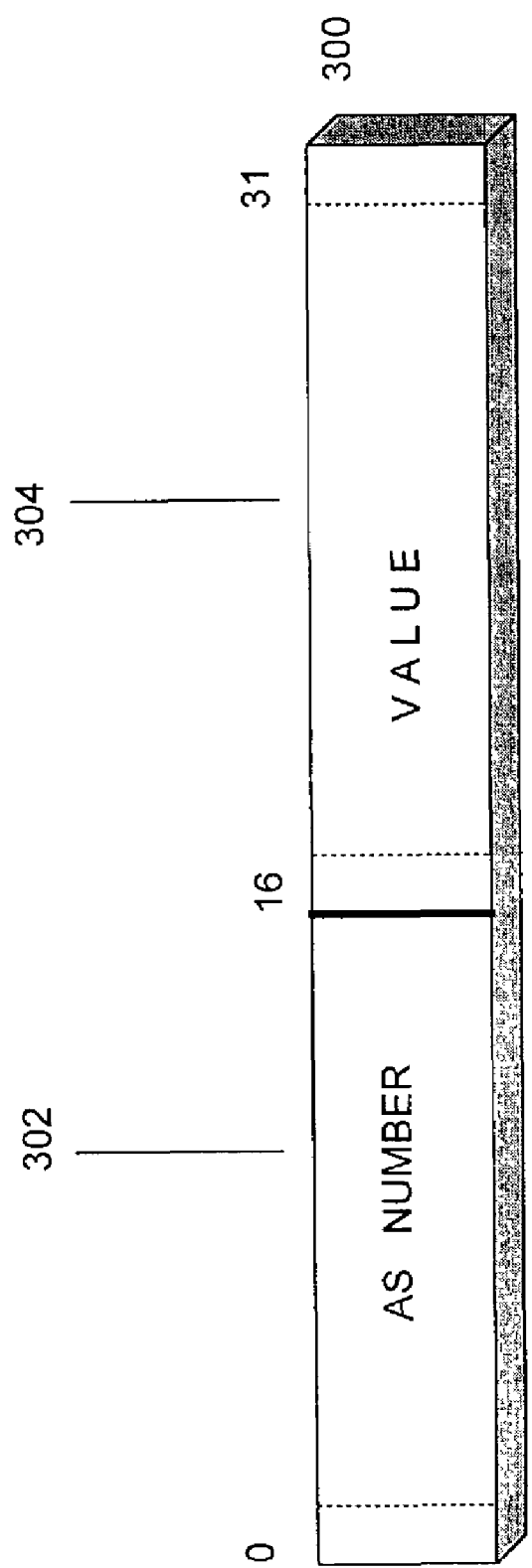
FIG. 3. illustrates a BGP communities attribute as used to communicate information between autonomous systems and the Routing Information Exchange according to some embodiments of the invention.

In some embodiments, the device on the customer premises 112 114 116 establishing a BGP4 session with the RIX 100 is a PACPE, thus enabling additional interactions with the RIX 100. In some such embodiments, the base BGP4 session has new information added to communicate data flows that enable RIX 100 components and enhance the operation of a PACPE 112 114 116. In some embodiments of the invention, this information is carried in the BGP Communities attribute in the feed to and from the RIX 100. A BGP Community 300, as illustrated in FIG. 3, is a 32 bit quantity: the first 16 bits 302 comprise an AS number and the second 16 bits 304 comprise a value whose interpretation is defined within that AS (AS: value). A private AS is a reserved set of AS numbers that can be used privately; the reserved set includes values from 64512 to 65535.

D. Equivalence Class Feed (from RIX to PACPE)

Some embodiments of the invention include an Equivalence Class (EC) feed, providing a PACPE 112 114 116 additional information about the structure of destination networks. Equivalence Classes comprise clusters of network prefixes which are grouped together. In some embodiments of the invention, network prefixes are grouped into an equivalence to reflect similar performance characteristics. Equivalence Classes are further described in U.S. Provisional Application No. 60/241,450, filed Oct. 17, 2000, and U.S. Provisional Application No. 60/275,206, filed Mar. 12, 2001, all of which are hereby incorporated by reference in their entirety.

The implementation of BGP4 within the Internet has been successful reducing the rate of growth in the number of routes a router needs to carry; networks today are encouraged to advertise the largest possible aggregation of network routes (smallest number of routes) when exchanging information with other networks. However, this causes information about geographic deployment and connectivity of smaller aggregations to be lost to the general Internet. The EC feed is recognition that current Internet priorities, such as to reduce route table size, are in opposition to selecting the best performance route to specific destinations.

In some embodiments of the invention, the EC feed to PACPE 112 114 116 comprise advertisements of destinations that have performance paths and should be treated as a unit for making measurement decisions. They can be more specific than a BGP advertisement, fragmenting the Internet BGP4 advertisement into smaller blocks with independent performance, or they may comprise multiple independent advertisements that are tagged as a performance group. Cases in which an EC Tag may be communicated to PACPE 112 114 116 are described below:

Prefix is Unique to the EC feed

A route is built with an EC destination and network mask. It is given an Origin AS associated with the RIX 100 and advertised into the eBGP feed from the RIX 100 to the customer. In some embodiments of the invention, the route is tagged with a community string using a private AS (AS 65001) and a value 0. If the EC is associated with other EC's in a performance group, a second community may be added to the string with the same private AS (AS 65001) and a value that is unique to all other EC's in the group. Any information other than the Community values can be rewritten by other data flows.

EC Network, Mask (Stand Alone EC)
AS Path: Origin AS RIX(65534)
Community String: (AS 65001:0)
EC Network, Mask (EC part of group ID)
AS Path: Origin AS RIX(65534)
Community String: (AS 65001:0), (AS 65001:group ID)

Prefix Exists as Part of Another Feed

In some embodiments of the invention, if there is already a route advertisement to the PACPE 112 114 116 from the RIX 100 from another data flow, to make that destination an EC, the route may be tagged with a community string using a private AS (AS 65001) and a value 0. If the EC is associated with other EC's in a performance group, a second community is added to the string with the same private AS (AS 65001) and a value that is unique to all other EC's in the group. If the original route advertisement is deleted, a new route is created and advertised as when the "Prefix is Unique to the EC Feed" as described above.

Destination Network, Mask (Stand Alone EC)
AS Path: Original AS Path
Community String: (AS 65001:0)
Destination Network, Mask (EC part of group ID)
AS Path: Original AS Path
Community String: (AS 65001:0), (AS 65001:group ID)

E. Performance Measurements from PACPE to the RIX

In some embodiments of the invention, data may be sent to the RIX 100 from a PACPE box 112 114 116 on a customer premise that is measuring performance. Performance measurements across available ISP paths are encoded and sent to the RIX 100 as community values and associated with the active route.

In some embodiments of the invention, the performance value is sent as (FH AS: value). The "First hop (FH) AS" is the first ISP's AS over the measurement path. The value is an encoded measure of performance and defined as a <type, argument> value pair.

Measurements Associated with a BGP Selected Route

In some embodiments of the invention, if the measurement values are associated with a route currently being advertised to the RIX 100, the route is tagged with the BGP communities containing the performance data. Performance data may be inserted as a new route advertisement with the new Community values. If the route is changed, the measurement values do not need to be moved to the new route advertisement. A new set of periodic performance data can be sent to the RIX 100 when available in the new advertisement.

Destination Network, Mask
  AS Path: Original AS Path
  Community String: (FH AS1: value1), . . . (FH ASx: valuex), Original Community String
  Measurements Associated with a Performance Selected Route If the measurement values are associated with a route that has been chosen based on a local performance decision, the original routing information may not be available to the PACPE 112 114 116. If the path information is available the case should be treated as in the "Measurements Associated with a BGP Selected Route" scenario described above. If the information is not available, a route advertisement may be made for the Performance Selected Route. If the route is changed or a new route added, the measurement values do not need to be moved to the new route advertisement. A new set of periodic performance data can be sent to the RIX 100 when available in the new advertisement.

Destination Network, Mask
  AS Path: Original FH AS, RIX(65534), origin AS
  Community String: (FH AS1: value1), . . . (FH ASx: valuex), Original Community String
  Measurements Associated with EC's not in BGP:

If the measurement values are associated with an EC but the PACPE 112 114 116 has not installed the EC as a route into the customer forwarding routers, the performance data may be sent to the RIX 100 in some embodiments of the invention by building a route advertisement. The advertisement is for the EC using the AS of the RIX 100 as the origin AS and inserting the BGP communities with the performance measurements associated with each FH path.

Destination Network, Mask
  AS Path: Origin AS RIX(65534)
  Community String: (65001:0), (65001:ID), (FH AS1: value1), . . . (FH ASx: valuex)

F. Performance Measurements from RIX to PACPE

In some embodiments of the invention, the RIX 100 takes performance data received from PACPE feeds to the RIX 100 and aggregates measurements into a value that is representative of ISP performance in a localized area. This information is then relayed to PACPE 112 114 116. PACPE devices 112 114 116 use the information to make decisions about performance-based First Hop ISP outbound path choices.

Another type of performance data that may be sent to the PACPE 112 is the value of the performance advertisement to the RIX 100 from another customer PACPE 116. This is the value associated with a local PACPE measurement advertised to the RIX 100 from the customer that owns the prefix to the receiver of the feed. This is a form of Cooperative Routing that relays information between source and destination networks. The received value for performance from a PACPE may be used to encode a value as a BGP Community in the form (65100: value). In some embodiments of the invention, the community is then tagged onto routes in any PACPE feeds that contain the prefix owned by the original advertiser.

Prefix is Unique to the EC Feed:

If the prefix is unique to the EC feed, performance information can be tagged by adding BGP community values. In some embodiments of the invention, the performance value is sent as (FH AS: value). The "First hop (FH) AS" is the first ISP's AS over the measurement path. The value is an encoded measure of performance and defined as a <type, argument> value pair.

Destination Network, Mask (Stand Alone EC)
  AS Path: Origin AS RIX(65534)
  Community String: (AS 65001:0), (FH AS1:value1), . . . (FH ASx: valuex)
  Destination Network, Mask (EC part of group ID)
  AS Path: Origin AS RIX(65534)
  Community String: (AS 65001:0), (AS 65001:group ID), (FH AS1: value1), . . . (FH ASx: valuex)
  Prefix Exists as Part of Another Feed If the measurement values are associated with a route currently being advertised to the PACPE 112 114 116, the route may be tagged with the BGP communities containing the performance data. Performance data can be inserted as a new route advertisement with the new BGP Community values. If the route is changed, the measurement values do not need to be moved to the new route advertisement, and a current set of performance data can be sent from the RIX 100.

Destination Network, Mask
  AS Path: Original AS Path
  Community String: (FH AS1: value1), . . . (FH ASx: valuex), (65100: value), Original Community String G. Cooperative Data Feed from PACPE to RIX Some embodiments of the invention support Cooperative Routing between source and destination networks. The Cooperative Routing function in the RIX 100 enables the encoding of information that is communicated intact about network pairs (destination prefixes to source networks). This information can be used to communicate information including, but not limited to any one of the following: hints, policy, performance, requests, status, and information. Each of these Cooperative Routing verbs relate information about the tagged route.

In some embodiments of the invention, The Cooperative Routing data verbs are carried as BGP Community of the form:

(Cooperative Private AS: value). The values are defined for each Cooperative Private AS and can take the form of <type, value>.

In some embodiments of the invention, Cooperative Routing Information may be defined as below. This is provided as an example, as many other suitable permutations of Private AS values will be apparent to those skilled in the art:
(65001–65100: value)
65001 EC
65002 Requesting Symmetric AS Path Routing: 0
65003 Prefer paths with this AS ($1^{st}$ priority): AS
65004 Prefer paths with this AS ($2^{nd}$ priority): AS
65005 Prefer paths with this AS ($3^{rd}$ priority): AS
65006 Avoid paths with this AS ($1^{st}$ priority): AS
65007 Avoid paths with this AS ($2^{nd}$ priority): AS 65008 Avoid paths with this AS (3$^{rd}$ priority): AS
65009 DOS attack (Black Hole): 0
65010 DOS attack (Rate Limit): 0
65011 DOS attack (Informational): 0
65012 Packet Loss Unacceptable: value (encoded Packet Loss number)
65013 Jitter Unacceptable: value (encoded Jitter Number)
65014 Scheduled Outage: value (date,time,duration)
65015–65099 Reserved
65100 Performance data:value H. Cooperative Data Feed from RIX to PACPE In some embodiments of the invention, the Cooperative Routing information that is received by the RIX 100 is parsed to aggregate information from all customers about a specific customer. This information can then be used to annotate the BGP4 feed to the PACPE 112 114 116. For example, a customer that wishes to inform a remote network that they recommend preferring Internet paths in the reverse direction that contain a particular transit ISP (AS10) may take the route advertisement to the remote network and insert a BGP Community value of (65003:AS10). The RIX 100 takes this information and communicates it to the POP where the remote network has a RIX feed. The (65003: AS10) BGP community can then be assigned to the route in the remote networks feed associated with the customer network. A PACPE 112 114 116 receiving this information can make a local decision about how much weight to put on the request, from ignoring it to following absolutely.

In an illustrative example, Network1 sends its BGP4 feed to the RIX with the routes to Network2 assigned a Community value of (65003:AS10). Network1 is informing Network2 that it prefers reverse paths that contain AS10.

Network1 to RIX (AS1):
192.100.10.X AS Path: AS1
192.200.20.X AS Path: AS10, AS30, AS2
Community String: (65003:AS10)
Network2 to RIX (AS2):
192.200.20.X AS Path: AS2
192.100.10.X AS Path: AS20, AS1
Community String:
BGP feed from RIX to Network1 and Network2
RIX to Network1 (AS1)
192.200.20.X AS Path: AS2, AS20, AS1
Community String:
RIX to Network2 (AS2)
192.100.10.X AS Path: AS1, AS10, AS30, AS2
Community String: (65003: AS10)

I. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. In an internetwork comprising a plurality of coupled autonomous systems, wherein the plurality of coupled autonomous systems communicate routing information via a Border Gateway Protocol (BGP), and the internetwork includes a routing overlay network to communicate routing parameters between the plurality of coupled autonomous systems, a BGP update message comprising:
 a Network Layer Reachability Information (NLRI) field, the NLRI field including:
  a first network prefix; and
  a first network mask;
 an origin attribute, the origin attribute including an identifier for the routing overlay network; and
 a first community attribute, the first community attribute including:
  an identifier for a private autonomous system from the plurality of autonomous systems.

2. The BGP update message of claim 1, wherein the BGP update message is transmitted from the routing overlay network to one or more points of presence in the plurality of coupled autonomous systems.

3. The BGP update message of claim 1, wherein the first network prefix and the first network mask comprise a first classless address, the first classless address identifying a first internetwork destination.

4. The BGP update message of claim 3, wherein the first classless address is a member of an equivalence class of addresses, the equivalence class including a plurality of classless network addresses, wherein the plurality of classless network addresses are in geographical proximity.

5. The BGP update message of claim 3, wherein the first classless address is a member of an equivalence class of addresses, the equivalence class including a plurality of classless network addresses, wherein the plurality of classless network addresses have jitter statistics within a pre-defined threshold.

6. The BGP update message of claim 3, wherein the first classless address is a member of an equivalence class of addresses, the equivalence class including a plurality of classless network addresses, wherein the plurality of classless network addresses have packet loss statistics within a pre-defined threshold.

7. The BGP update message of claim 3, wherein the first classless address is a member of an equivalence class of addresses, the equivalence class including a plurality of classless network addresses, wherein the plurality of classless network addresses have packet delay statistics within a predefined threshold.

8. The BGP update message of claim 3, wherein the first classless address is a member of an equivalence class of addresses, the equivalence class including a plurality of classless network addresses, wherein the plurality of classless network addresses have similar jitter, delay, and loss statistics within a pre-determined threshold.

9. The BGP update message of claim 8, wherein the equivalence class includes a second classless address, the second classless address including:
 a second network prefix; and
 a second network mask.

10. The BGP update message of claim 9, wherein the second classless address identifies a second internetwork destination.

11. The BGP update message of claim 10, further comprising:
 a second community attribute, the second community attribute including:
  the identifier for the private autonomous system; and
  a scalar identifier for the equivalence class.

12. The BGP update message of claim 11, wherein the identifier for the routing overlay network is 65534.

13. The BGP update message of claim 12, wherein the identifier for the private autonomous system has the value 65001.

14. In an internetwork comprising a plurality of coupled autonomous systems, wherein the plurality of coupled autonomous systems communicate routing information via a Border Gateway Protocol (BGP), and the internetwork includes a routing overlay network to communicate routing parameters between the plurality of coupled autonomous systems, a method of identifying a classless network address as a member of an equivalence class, the equivalence class comprising a plurality of classless addresses, wherein a route for the classless address has already been advertised to the plurality of coupled autonomous systems, the method comprising:

generating a BGP update message, the BGP update message including:
a destination network for the classless address;
a network mask for the classless address;
an Autonomous System (AS) Path attribute, the AS Path attribute having a value of the route for the network destination; and
a first community attribute, the community attribute including:
an identifier for a private autonomous system from the plurality of coupled autonomous systems; and
forwarding the BGP update message from the routing overlay network to the plurality of coupled autonomous systems.

15. The method of claim 14, wherein the first community attribute is a scalar with a value 65001.

16. The method of claim 15, wherein the first community attribute further includes a value 0.

17. The method of claim 14, wherein the plurality of classless addresses in the equivalence class have similar network performance characteristics.

18. The method of claim 17, wherein the plurality of classless addresses are in geographic proximity.

19. The method of claim 17, wherein the similar network performance characteristics include one or more of delay statistics, jitter statistics, and loss statistics.

20. The method of claim 17, wherein the BGP update message further includes a second community attribute, the second community attribute including:
the scalar with the value 65001; and
a unique scalar identifier for the equivalence class.

21. In an internetwork comprising a plurality of coupled autonomous systems, wherein the plurality of coupled autonomous systems communicate routing information via a Border Gateway Protocol (BGP) and the internetwork includes a routing overlay network to communicate routing parameters between the plurality of coupled autonomous systems, a method of communicating network performance parameters for a route in the internetwork, the method comprising:

advertising a BGP update message from a point of presence in the internetwork to the routing overlay network; and
prior to advertising the BGP update message, generating the BGP update message, the BGP update message including:
a classless address for a network destination of the route, the classless address further including:
an identifier for the network destination; and
a mask for the network destination;
an autonomous system path attribute, indicating a chain of autonomous systems from the plurality of coupled autonomous systems traversed by the route; and
a community string including:
a first hop autonomous system indicating an ISP coupled to the point of presence; and
one or more value pairs including:
a type, indicating a type of performance measurement of the route; and
an argument, indicating a value of the performance measurement of the route.

22. The method of claim 21, wherein the one or more value pairs includes a value pair indicating jitter measurements for the route, such that the type identifies the jitter measurement as jitter for the route, and the argument indicates the value for the jitter.

23. The method of claim 21, wherein the one or more value pairs includes a value pair indicating packet drop measurement for the route, such that the type identifies the measurement as packet drop for the route, and the argument indicates the value for the packet drop.

24. The method of claim 21, wherein the one or more value pairs includes a value pair indicating delay measurement for the route, such that the type identifies the measurement as delay for the route, and the argument indicates the value for the delay as delay.

25. The method of claim 21, wherein the autonomous path attribute includes an identifier for the routing overlay network.

26. The method of claim 25, wherein the identifier for the routing overlay network is 65534.

27. In an internetwork comprising a plurality of coupled autonomous systems, wherein the plurality of coupled autonomous systems (ASs) communicate routing information via a Border Gateway Protocol (BGP) and the internetwork includes a routing overlay network to communicate routing parameters between the plurality of coupled autonomous systems, a method of exchanging routing information between a source network and a destination network coupled to the internetwork, the method comprising:

inserting a BGP community into a BGP feed, the BGP community including:
a cooperative private autonomous system field, the cooperative private autonomous system field being between 65001 and 65100; and
a corresponding value corresponding to the cooperative private autonomous system field; and
exchanging the BGP feed between the source network and the destination network via the routing overlay network.

28. The method of claim 27, wherein the cooperative private autonomous system field has a value of 65001, indicating that the value is an identifier of an equivalence class, the equivalence class including a group of network addresses.

29. The method of claim 28, wherein the group of network addresses exhibit similar network performance characteristics.

30. The method of claim 28, wherein the group of network addresses have similar measurements for jitter.

31. The method of claim 28, wherein the group of network addresses have similar measurements for packet loss.

32. The method of claim 28, wherein the group of network addresses have similar measurements for packet delay.

33. The method of claim 28, wherein the group of network addresses are geographically proximate.

34. The method of claim 27, wherein the cooperative private autonomous system field is 65002, such that the cooperative private autonomous system field indicates a request for symmetric AS path routing.

35. The method of claim 34, wherein the corresponding value is zero.

36. The method of claim 27, wherein the corresponding value is an AS from the plurality of coupled ASs, and the cooperative private autonomous system field has a value 65003, indicating that paths with the AS are preferred with first priority.

37. The method of claim 27, wherein the corresponding value is an AS from the plurality of coupled ASs, and the cooperative private autonomous system field has a value 65004, indicating that paths with the AS are preferred with second priority.

38. The method of claim 27, wherein the corresponding value is an AS from the plurality of coupled ASs, and the cooperative private autonomous system field has a value 65005, indicating that paths with the AS are preferred with third priority.

39. The method of claim 27, wherein the corresponding value is an AS from the plurality of coupled ASs, and the cooperative private autonomous system field has a value 65006, indicating that paths with the AS are to be avoided with first priority.

40. The method of claim 27, wherein the corresponding value is an AS from the plurality of coupled ASs, and the cooperative private autonomous system field has a value 65007, indicating that paths with the AS are to be avoided with second priority.

41. The method of claim 27, wherein the corresponding value is an AS from the plurality of coupled ASs, and the cooperative private autonomous system field has a value 65008, indicating that paths with the AS are to be avoided with third priority.

42. The method of claim 27, wherein the cooperative private autonomous system field has a value 65009, indicating a black hole Denial of Service Attack.

43. The method of claim 27, wherein the cooperative private autonomous system field has a value 650010 indicating a rate limit Denial of Service Attack.

44. The method of claim 27, wherein the cooperative private autonomous system field has a value 65011, indicating an informational Denial of Service Attack.

45. The method of claim 27, wherein the cooperative private autonomous system field has a value 65012, indicating unacceptable packet loss.

46. The method of claim 45, wherein the corresponding value indicates a packet loss number.

47. The method of claim 27, wherein the cooperative private autonomous system field has a value 65013, indicating unacceptable jitter.

48. The method of claim 47, wherein the corresponding value indicates a jitter number.

49. The method of claim 27, wherein the cooperative private autonomous system field has a value 65014, indicating a performance metric.

50. The method of claim 49, wherein the corresponding value is a scalar value of the performance metric.

* * * * *